(12) United States Patent
Ishibashi (10) Patent No.: US 9,755,440 B2
(45) Date of Patent: Sep. 5, 2017

(54) CHARGING CONTROL DEVICE AND CHARGING CONTROL METHOD

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 13/299,541

(22) Filed: Nov. 18, 2011

(65) Prior Publication Data

US 2012/0146588 A1 Jun. 14, 2012

(30) Foreign Application Priority Data

Dec. 8, 2010 (JP) ................................ P2010-273637

(51) Int. Cl.
*H02J 7/00* (2006.01)
(52) U.S. Cl.
CPC .......... *H02J 7/0018* (2013.01); *H02J 7/0055* (2013.01); *H02J 2007/0098* (2013.01)
(58) Field of Classification Search
CPC .. H02J 7/0018; H02J 1/10; H02J 1/102; H02J 1/108; H02J 1/12; H02J 2001/104; H02J 2001/106
USPC ........................................................ 320/138
See application file for complete search history.

(56) References Cited

U.S. PATENT DOCUMENTS

| | | | | |
|---|---|---|---|---|
| 5,486,749 A * | 1/1996 | Brainard | ....................... | 320/125 |
| 6,304,059 B1 * | 10/2001 | Chalasani | ............. | H02J 7/0018 320/118 |
| 8,063,610 B2 * | 11/2011 | Chavakula | ..................... | 320/138 |
| 8,569,998 B2 * | 10/2013 | Shim | ............................. | 320/134 |
| 2003/0002305 A1 * | 1/2003 | Takeuchi | ............ | B60L 11/1809 363/65 |
| 2003/0111908 A1 * | 6/2003 | Christensen | .............. | H02J 1/10 307/43 |
| 2007/0001644 A1 * | 1/2007 | Bayne | ................... | H02J 7/0027 320/107 |
| 2008/0174278 A1 * | 7/2008 | Masias | ...................... | H02J 1/10 320/138 |
| 2009/0066291 A1 * | 3/2009 | Tien | ...................... | H02J 7/0016 320/118 |
| 2009/0179493 A1 * | 7/2009 | Yeh | ................................ | 307/64 |
| 2009/0217060 A1 * | 8/2009 | Tsuchiya | ............... | G06F 1/3203 713/300 |
| 2011/0025124 A1 * | 2/2011 | Brabec | ................ | B60L 11/1861 307/9.1 |
| 2011/0025125 A1 * | 2/2011 | Brabec | ................ | B60L 11/1861 307/9.1 |
| 2011/0100735 A1 * | 5/2011 | Flett | ........................ | B60K 6/46 180/65.22 |
| 2013/0334878 A1 * | 12/2013 | Brabec | .......................... | 307/9.1 |

* cited by examiner

*Primary Examiner* — Richard Isla Rodas
*Assistant Examiner* — David V Henze-Gongola
(74) *Attorney, Agent, or Firm* — Paratus Law Group, PLLC (57) ABSTRACT

A charging control device includes a plurality of battery packs including a secondary battery therein, one or two or more power input units configured to input power, a power integration unit configured to integrate the power input by the one or two or more power input units to one power, and a main control unit configured to measure the quantity of power input to the power integration unit and determine the quantity of power supplied from the power integration unit to the battery packs based on the measured quantity of power so as to control simultaneous charging of the plurality of battery packs.

16 Claims, 8 Drawing Sheets

CHARGING CONTROL DEVICE AND CHARGING CONTROL METHOD

BACKGROUND

The present disclosure relates to a charging control device and a charging control method.

A battery server for accumulating electricity and carrying and using the accumulated electricity has been currently developed. Although the basic configuration of this battery server will be described below, for example, the battery server includes a power supply unit including a control module for charging of the battery when the battery is charged using power supplied from an external device or a control module for controlling the output of power accumulated in the battery.

The battery module mounted in the battery server may be divided into a plurality of sub battery modules in order to dynamically increase/decrease a battery capacity. These sub battery modules are connected in parallel through diodes or the like.

SUMMARY

If only one battery module is mounted in a battery server, it is easy to control the battery module by a power supply unit. Meanwhile, even when a plurality of battery modules is connected in order to dynamically increase/decrease a battery capacity, only one battery module may be charged, the plurality of battery modules may not be simultaneously charged. Thus, charging is controlled such that the battery modules are sequentially charged. The respective battery modules generally differ in charging/discharging voltage/characteristics according to the composition and configuration of a used secondary battery. Thus, the battery modules having different charging voltages may not be simultaneously charged.

For example, in the case where a plurality of battery modules are mounted in a battery server, when the battery modules are charged using natural energy in which the quantity of power is changed and power greater in quantity than the quantity of power used for one battery module is obtained, extra power is abandoned.

It is desirable to provide a new improved charging control device and charging control method capable of simultaneously charging a plurality of battery modules.

According to an embodiment of the present disclosure, there is provided a charging control device including: a plurality of battery packs including a secondary battery therein; one or two or more power input units configured to input power; a power integration unit configured to integrate the power input by the one or two or more power input units to one power; and a main control unit configured to measure the quantity of power input to the power integration unit and determine the quantity of power supplied from the power integration unit to the battery packs based on the measured quantity of power so as to control simultaneous charging of the plurality of battery packs.

Each of the plurality of battery packs may include a control unit configured to perform communication with the main control unit, and the control unit may receive the quantity of power supplied from the power integration unit from the main control unit.

Each of the plurality of battery packs may further include a charging control unit configured to control charging of the secondary battery based on information about the quantity of power supplied from the power integration unit.

The control unit and the charging control unit may be included according to the characteristics of the secondary battery.

The main control unit may determine that power less in quantity than the total quantity of power input to the power integration unit is supplied to each of the battery packs, when the quantity of power supplied to each of the battery packs is determined.

The main control unit may include a computing unit configured to compute the quantity of power input to the power integration unit and a communication unit configured to determine the quantity of power supplied to each of the battery packs from the quantity of power input to the power integration unit and communicate with each of the battery packs.

The plurality of battery packs may be attachable and detachable.

According to another embodiment of the present disclosure, there is provided a charging control method including inputting one or two or more power; integrating the power input in the one or two or more inputting to one power, and measuring the quantity of power before integrating the power by inputting power and determining the quantity of power supplied to a plurality of battery packs including a secondary battery therein so as to control simultaneous charging of the plurality of battery packs.

According to another embodiment of the present disclosure, there is provided a charging control device including one or two or more power input units configured to input power; a power integration unit configured to integrate the power input by the one or two or more power input units to one power; and a main control unit configured to measure the quantity of power input to the power integration unit and determine the quantity of power supplied from the power integration unit to a plurality of battery packs including a secondary battery therein based on the measured quantity of power so as to control simultaneous charging of the plurality of battery packs.

According to another embodiment of the present disclosure, there is provided a charging control device including a plurality of battery packs including a secondary battery therein; one or two or more power input units configured to input power; a power integration unit configured to integrate the power input by the one or two or more power input units to one power; and a main control unit configured to instruct a power supply ratio and a power increase/decrease quantity of the battery packs and control simultaneous charging of the plurality of battery packs.

Each of the plurality of battery packs may include a control unit configured to perform communication with the main control unit, and the control unit may adjust the quantity of power supplied from the power integration unit to become the ratio received from the main control unit.

Each of the plurality of battery packs may include a detection unit configured to detect the output voltage of the power integration unit, and the control unit may adjust the output voltage of the power integration unit to become an assumed output voltage of the power integration unit.

According to another embodiment of the present disclosure, there is provided a charging control device including a plurality of battery packs including a secondary battery therein; one or two or more power input units configured to input power; a power integration unit configured to integrate the power input by the one or two or more power input units to one power; and a main control unit configured to instruct power supply priority of the battery packs and control simultaneous charging of the plurality of battery packs.

Each of the plurality of battery packs may include a control unit configured to perform communication with the main control unit, and the control unit may adjust the quantity of power supplied from the power integration unit according to the priority received from the main control unit.

Each of the plurality of battery packs may include a detection unit configured to detect the output voltage of the power integration unit, and the control unit may adjust the output voltage of the power integration unit to become an assumed output voltage of the power integration unit.

As described above, according to the present disclosure, it is possible to provide a new improved charging control device and charging control method capable of simultaneously charging a plurality of battery modules.

DETAILED DESCRIPTION OF EMBODIMENTS

Hereinafter, exemplary embodiments of the present disclosure will be described in detail with reference to the accompanying drawings. In the present specification and drawings, components having substantially the same functional configurations are denoted by the same reference numerals and a repeated description will be omitted.

The description is given in the following order.

<1. Charging Control Device of the Related Art>
<2. Embodiment of the Present Disclosure>
[2-1. Configuration of Battery Server]
[2-2. Operation of Battery Server]
<3. Summary>

1. Charging Control Device of the Related Art

First, before describing the exemplary embodiments of the present disclosure, a configuration example of a charging control device of the related art and problems of the charging control device of the related art will be described.

Figure 6:
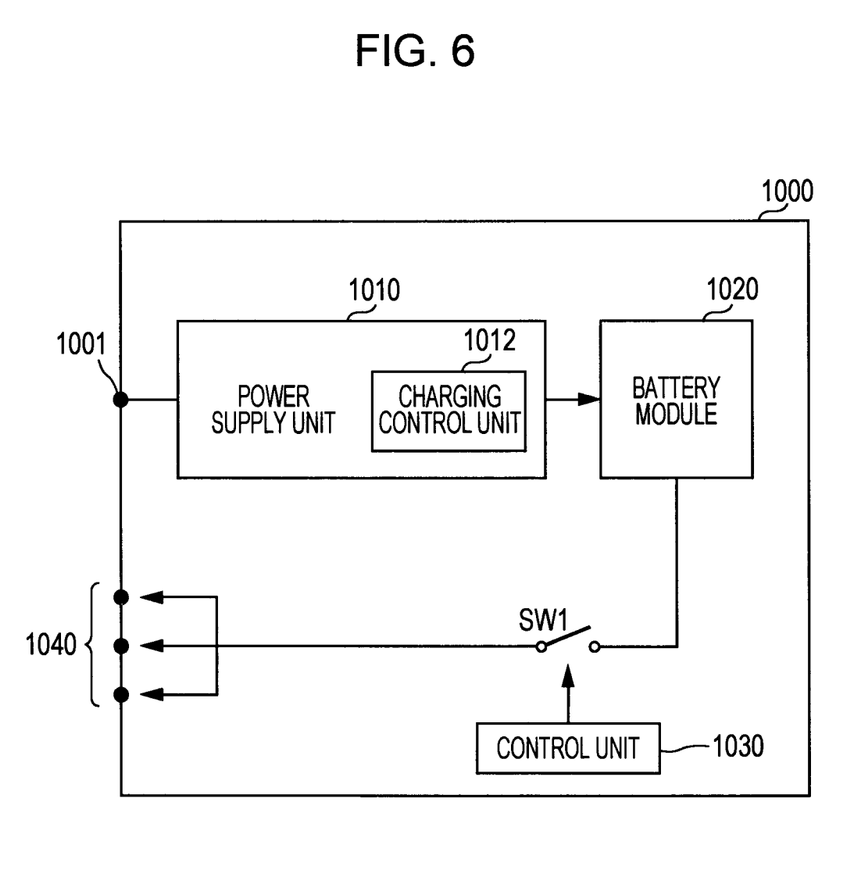
FIG. 6 is an explanatory diagram showing a configuration example of a battery server which is an example of a charging control device of the related art.
Figure 7:
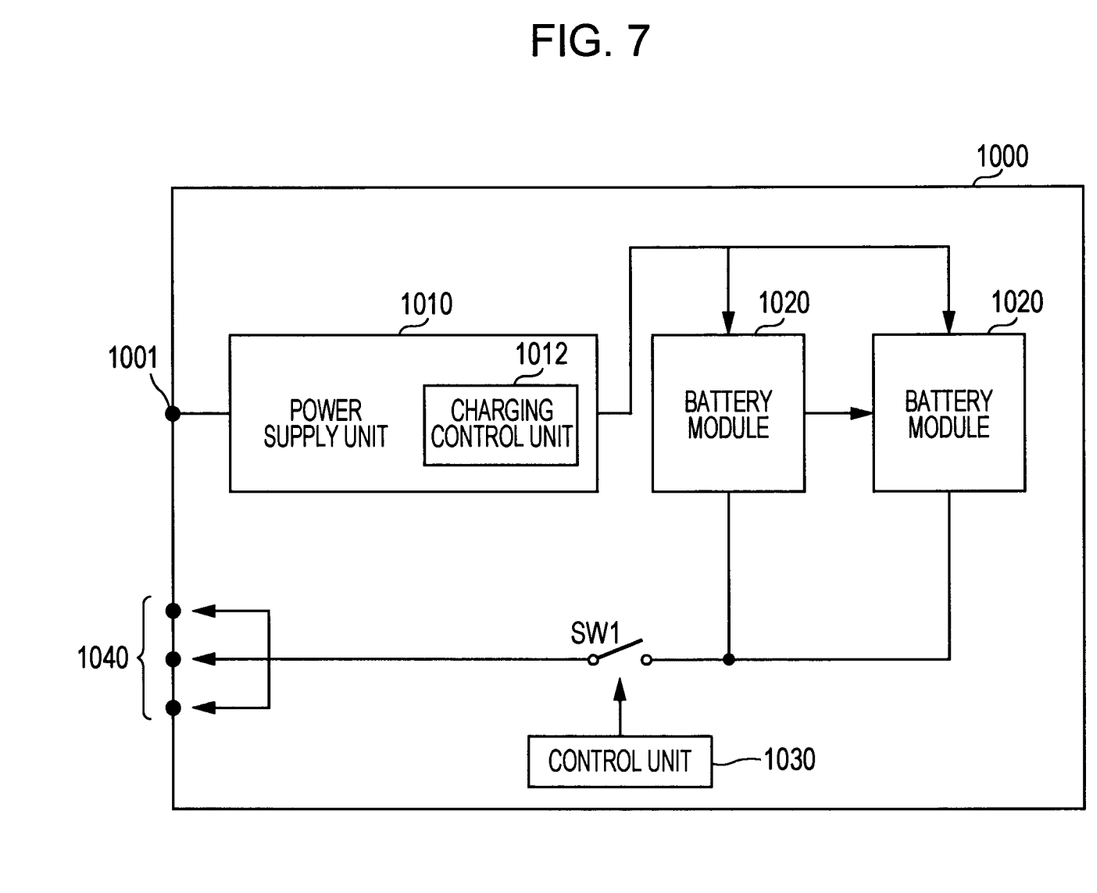
FIG. 7 is an explanatory diagram showing a configuration example of the battery server which is an example of a charging control device of the related art.
Figure 8:
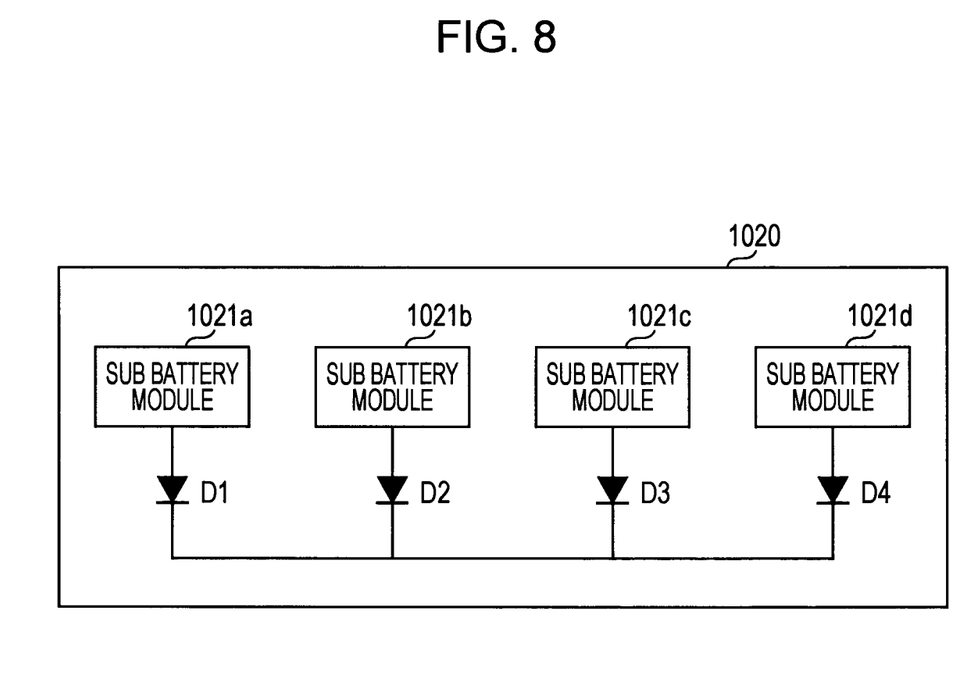
FIG. 8 is an explanatory diagram showing a configuration example of the battery server which is an example of a charging control device of the related art.

FIGS. 6 to 8 are exemplary diagram showing a configuration example of a battery server 1000 which is an example of a charging control device of the related art. As shown in FIG. 6, the charging control device 1000 of the related art includes an AC/DC input terminal 1001, a power supply unit 1010, a battery module 1020, a control unit 1030 and a general-purpose DC output terminal 1040.

The AC/DC input terminal 1001 is a terminal for inputting power generated outside the battery server 1000. This power may be generated by an electric power company in an electric generation plant or generated from a power generation unit using natural energy such as photovoltaic power generation or wind-power generation or instable energy such as human power generation. The power input to the AC/DC input terminal 1001 is sent to the power supply unit 1010.

The power supply unit 1010 performs processes such as AC-DC conversion, rectification, boosting and the like with respect to the power input to the AC/DC input terminal 1001, in order to charge the battery module 1020. The power supply unit 1010 includes a charging control unit 1012 as shown in FIG. 6. The charging control unit 1012 executes the charging control of the battery module 1020. The charging control executed by the charging control unit 1012 may be, for example, a CCCV charging process.

The battery module 1020 is a module including a chargeable/dischargeable secondary battery therein and accumulates a predetermined quantity of power therein. Although one battery module is connected to one battery server 1000 in FIG. 6, as shown in FIG. 7, a plurality of battery modules may be connected to one battery server 1000. This battery module 1020 may be divided into a plurality of sub battery modules 1021$a$ to 1021$d$, as shown in FIG. 8. The plurality of sub battery modules 1021$a$ to 1021$d$ are connected in parallel through diodes D1 to D4.

If a plurality of battery modules 1020 are included in the battery module 1000, the charging control unit 1012 charges only one battery module and charges another battery module if one battery module is charged to the full state or up to a predetermined quantity. Thus, the battery server 1000 of the related art abandons extra power when power greater in quantity than the quantity of power used for charging one or more battery modules is input from the AC/DC input terminal 1001.

In the case where the compositions, configurations and the characteristics of the plurality of battery modules 1020 are identical and charging states thereof are identical, the plurality of battery modules 1020 may be simultaneously charged. This is only limited to the case where the battery module 1020 has the same configuration as the sub battery modules 1021 of FIG. 8.

The control unit 1030 controls on/off of a switch SW1 including a MOSFET or the like, in order to output the power accumulated in the battery module 1020 from the general-purpose DC output terminal 1040. When the power accumulated in the battery module 1020 is output from the general-purpose DC output terminal 1040, a voltage may be output without change or may be changed to a predetermined voltage (for example, 48 V) and the changed voltage may be output. Alternatively, the voltage may be changed to an AC output through an inverter or the like and the AC output may be output.

The general-purpose DC output terminal 1040 supplies the power accumulated in the battery module 1020 to the outside of the battery server 1000. If a cable is connected to the general-purpose DC output terminal 1040 so as to turn the switch SW1 on by a predetermined operation of the control unit 1030, the power accumulated in the battery module 1020 may be output from the general-purpose DC output terminal 1040.

The battery server 1000 which is an example of the charging control device of the related art has the above configuration, and, as described above, in the case where only one battery module is mounted in the battery server, it is easy to control the battery module by the power supply unit. Meanwhile, even when a plurality of battery modules is connected in order to dynamically increase/decrease a battery capacity, only one battery module may be charged, the plurality of battery modules may not be simultaneously charged. Thus, charging is controlled such that the battery modules are sequentially charged. The reason is described above.

For example, in the case where a plurality of battery modules are mounted in a battery server, when the battery modules are charged using natural energy, in which the quantity of power is changed, or the like and power greater in quantity than the quantity of power used for one battery module is obtained, extra power is abandoned.

In the following embodiments of the present disclosure, a battery server and a charging control method capable of simultaneously charging a plurality of battery modules will be described.

2. Embodiment of the Present Disclosure

[2-1. Configuration of Battery Server]

Figure 1:
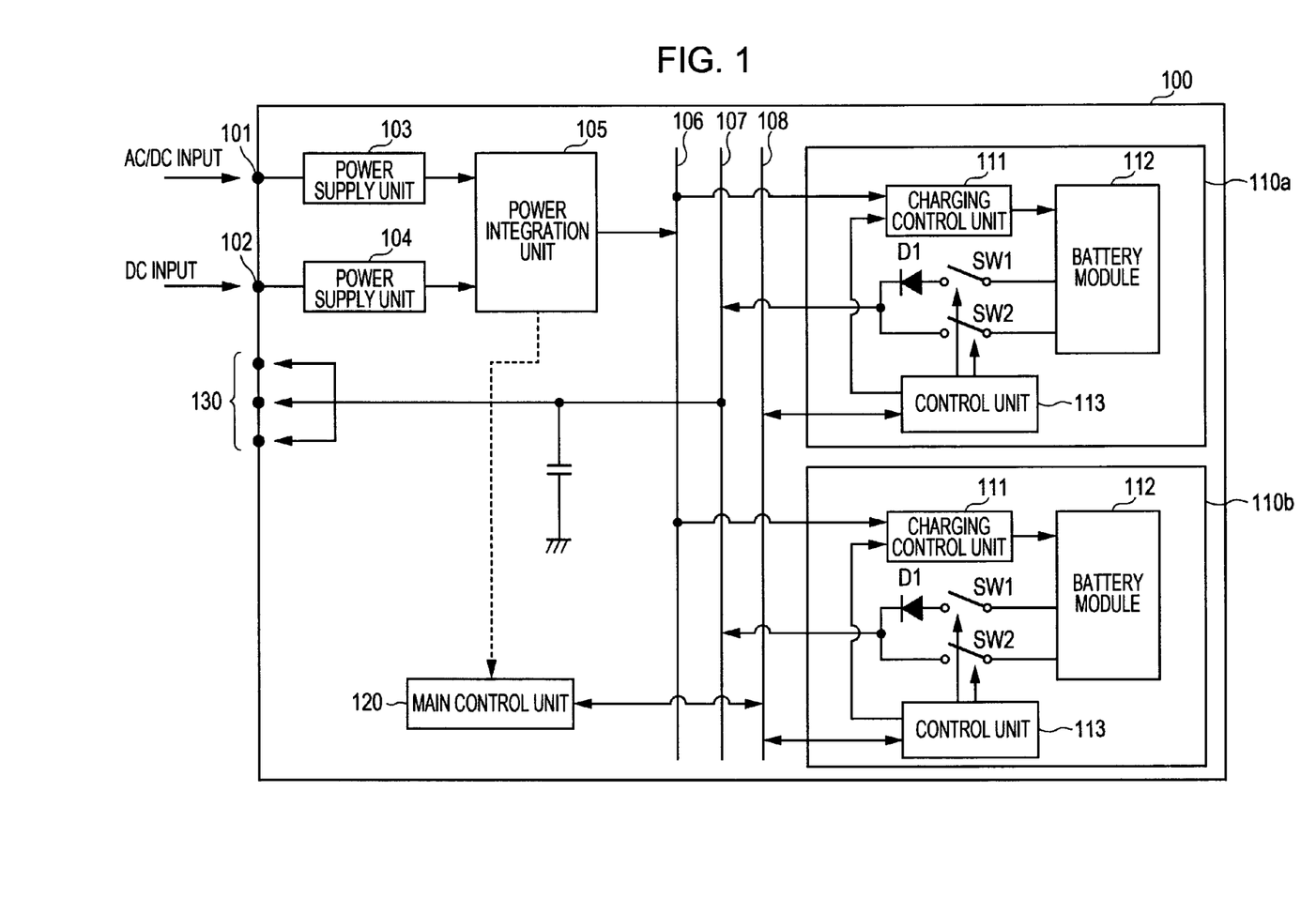
FIG. 1 is an explanatory diagram showing the configuration of a battery server according to an embodiment of the present disclosure, which is an example of a charging control device of the present disclosure.

FIG. 1 is an explanatory diagram showing the configuration of a battery server 100 according to an embodiment of the present disclosure, which is an example of a charging control device of the present disclosure. Hereinafter, the configuration of the battery server 100 according to the embodiment of the present disclosure will be described using FIG. 1.

As shown in FIG. 1, the battery server 100 according to the embodiment of the present disclosure includes an AC/DC input terminal 101, a DC input terminal 102, power supply units 103 and 104, a power integration unit 105, a charging line 106, a discharging line 107, an information communication line 108, battery packs 110a and 110b, a main control unit 120, and a general-purpose DC output terminal 130.

The AC/DC input terminal 101 is a terminal for inputting power generated outside the battery server 100. This power may be generated by an electric power company in an electric generation plant or generated from a power generation unit using natural energy such as photovoltaic power generation or wind-power generation or instable energy such as human power generation. The power input to the AC/DC input terminal 101 is sent to the power supply unit 103. Although the AC/DC input terminal 101 which is a common terminal of AC and DC is included, each terminal may be provided in each of AC and DC.

The DC input terminal 102 is a terminal for inputting power generated outside the battery server 100. The power input to the DC input terminal 102 may be generated from a power generation unit using mainly natural energy such as photovoltaic power generation or wind-power generation or instable energy such as human power generation. The power input to the DC input terminal 102 is sent to the power supply unit 104.

Although the battery server 100 shown in FIG. 1 includes two terminals for receiving power, in the present disclosure, the number of terminals for receiving power is not limited to this example.

The power supply unit 103 performs processes such as AC-DC conversion, rectification, boosting and the like with respect to the power input to the AC/DC input terminal 101, in order to charge the battery packs 110a and 110b. The power supply unit 104 performs processes such as rectification, boosting and the like with respect to the power input to the DC input terminal 102, in order to charge the battery packs 110a and 110b.

In the power supply units 103 and 104, maximum power is extracted through a maximum power point tracker (MPPT) or the like and is adjusted to a predetermined voltage.

The power subjected to the various processes in the power supply units 103 and 104 is output to the power integration unit 105. Although two power supply units. 103 and 104 are included in the battery server 100 shown in FIG. 1, the present disclosure is not limited to this example and power supply units are provided according to terminals for receiving power.

The power integration unit 105 integrates the power output from the power supply units 103 and 104 and outputs the integrated power. Although the detailed configuration of the power integration unit 105 will be described below, for example, the power output from the power supply units 103 and 104 are synthesized through a capacitor or a diode. The power synthesized by the power integration unit 105 is supplied to the battery packs 110a and 110b under the control of the main control unit 120. If only one power supply unit is mounted in the battery server 100, the power integration unit 105 may not be included.

The charging line 106 is a power line for supplying the power integrated by and output from the power integration unit 105 to the battery packs 110a and 110b. The discharging line 107 is a power line for outputting the power accumulated in the battery packs 110a and 110b from the general-purpose DC output terminal 130. The information communication line 108 is a communication line for performing information communication between the main control unit 120 and the control units 113 included in the battery packs 110a and 110b.

Each of the battery packs 110a and 110b includes a battery module therein and enables power to be accumulated and discharged. The battery packs 110a and 110b may be detachably configured in the battery server 100 and may be configured so as to be detached and used from the battery server 100 if the charging of the battery module is completed. Although the number of battery packs is two in FIG. 1, in the present disclosure, the number of battery packs included in the battery server 100 is not limited to this example.

As shown in FIG. 1, each of the battery packs 110a and 110b includes a charging control unit 111, a battery module 112, a control unit 113, switches SW1 and SW2, and a diode D1.

The charging control unit 111 receives power supplied from the power integration unit 105 through the charging line 106 and supplies power to the battery module 112, thereby controlling the charging of the battery module 112.

The battery module 112 includes a secondary battery, may accumulate power supplied from the charging control unit 111, and may externally discharge the accumulated power if the switches SW1 and SW2 are turned on by the control unit 113. The battery module 112 may be divided into a plurality of sub battery modules as necessary. As the battery used in the battery module 112 may be any one of general secondary batteries (battery cells) such as a lithium-ion battery, a nickel hydride battery or a lead battery. The configuration of the battery module 112 or the sub battery module may be any configuration in which a plurality of battery cells are connected in series or in parallel.

The control unit 113 controls on/off of the switches SW1 and SW2 in order to discharge the power accumulated in the battery module 112 to the outside of the battery packs 110a and 110b. The control unit 113 may perform communication with the main control unit 120 and controls on/off of the switches SW1 and SW2 based on the result of communication with the main control unit 120.

As described above, various batteries may be used as the battery used in the battery module 112. The charging control unit 111 and the control unit 113 may be made according to the characteristics of the battery used in the battery module 112. Since the charging control unit 111 and the control unit 113 are made according to the characteristics of the battery used in the battery module 112, the main control unit 120 may regard each battery pack as a single type of battery pack although different secondary batteries are used.

The main control unit 120 controls the operation of the battery server 100. More specifically, the main control unit 120 monitors the power input to the power integration unit 105. In order to monitor the power input to the power integration unit 105, the main control unit 120 measures the voltage of the capacitor and the quantity of current flowing in the diode. Thus, the main control unit 120 calculates the quantity of power input to the power integration unit 105. The main control unit 102 may A/D convert the measured parameter and calculate the quantity of power using the parameter obtained as a digital value.

The main control unit 120 supplies total power input to the power integration unit 105 to the battery packs 110a and 110b. More specifically, for example, if power of 300 W is obtained as the result of monitoring the power input to the power integration unit 105, it is determined that 200 W is supplied to the battery pack 110a and 95W is supplied to the battery pack 110b. The main control unit 120 provides an instruction to the battery packs 110a and 110b through the information communication unit 108. The battery packs 110a and 110b which receive this instruction absorb the power assigned thereto and charge the battery module 112 included therein.

At this time, it is important to provide the instruction (for example, about 90% to 95% of the total power input to the power integration unit 105) slightly less than the supplied total power. This is because, if the quantity of power is large, load is increased and power shortage occurs. If the output voltages of the power supply units 103 and 104 are not completely equalized, a problem may occur. That is, this is because power is received from only a power supply unit with a high voltage. However, in actuality, it is difficult to completely equalize the output voltages of the power supply units 103 and 104. However, for example, even when the output voltage of the power supply unit 103 is slightly higher than the output voltage of the power supply unit 104, it is possible to equalize the outputs of both the power supply units in a relation for absorbing power of all power of 295 W. That is, this is because power is first consumed from a high voltage side, but, in order to extract power greater than the output of the power supply unit having a high voltage, the voltage of the high voltage side is gradually decreased and, as a result, the output voltages of the two power supply units 103 and 104 are equalized. That is, if the power supply units 103 and 104 are designed to have the same output to some extent, the power integration unit 105 may synthesize two power.

The general-purpose DC output terminal 130 outputs the power accumulated in the battery packs 110a and 110b to the outside of the battery server 100. In the battery server 100 according to the present embodiment, although the terminal for enabling the DC output is included as the terminal for outputting power to the outside of the battery server 100, the present disclosure is not limited to this example.

Up to now, the configuration of the battery server 100 according to the embodiment of the present disclosure is described. Subsequently, the configurations of the power integration unit 105 and the main control unit 120 included in the battery server 100 described using FIG. 1 will be described in detail.

Figure 2:
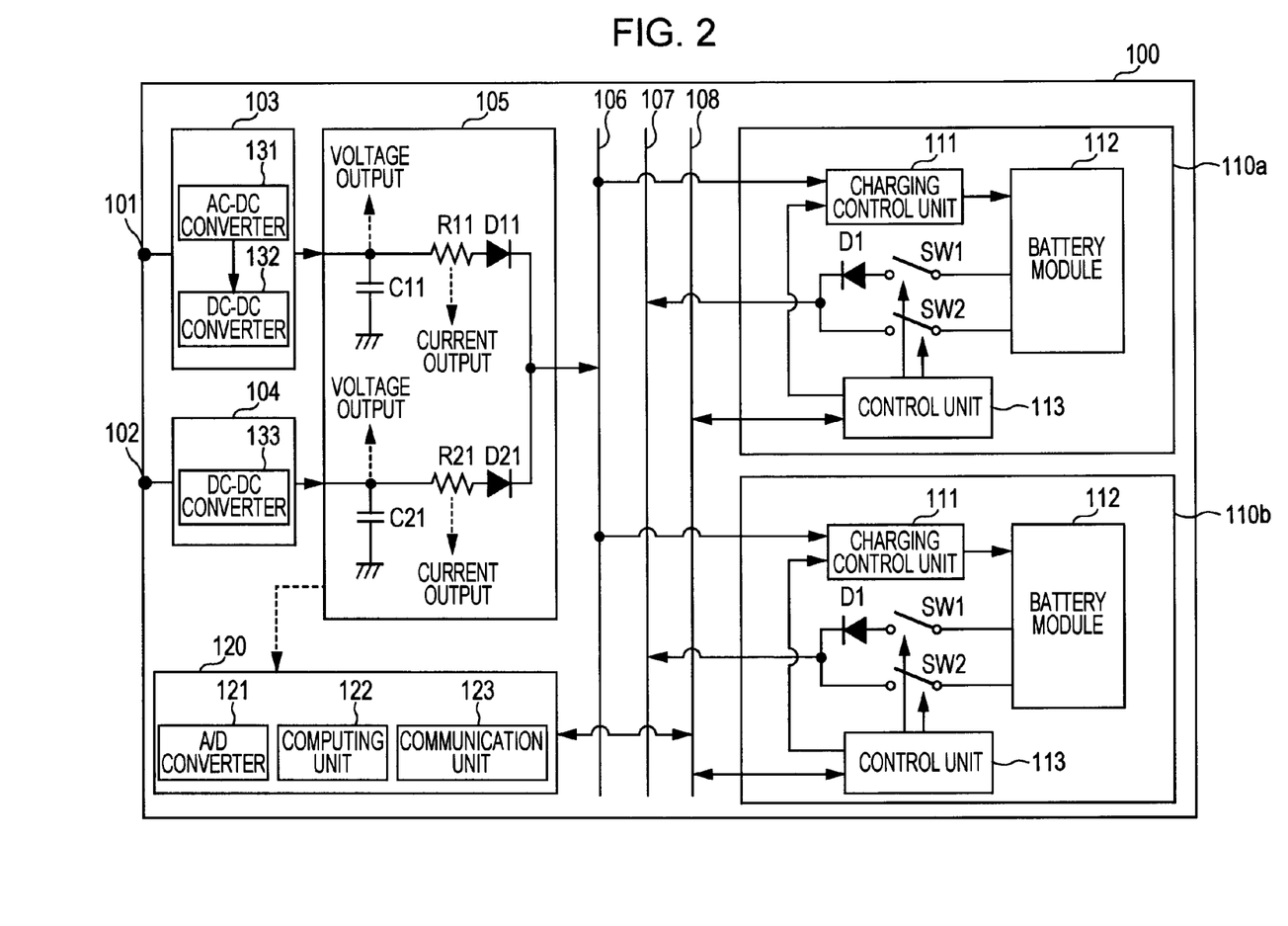
FIG. 2 is an explanatory diagram showing the configuration of a power integration unit and a main control unit in detail.

FIG. 2 is an explanatory diagram showing the configuration of the battery server 100 according to the embodiment of the present disclosure and is an explanatory diagram showing the configurations of the power integration unit 105 and the main control unit 120 in detail. Hereinafter, the configurations of the power integration unit 105 and the main control unit 120 included in the battery server 100 according to the embodiment of the present disclosure will be described in detail.

As shown in FIG. 2, the power integration unit 105 includes capacitors C11 and C21, resistors R11 and R21 and diodes D11 and D21.

As shown in FIG. 2, the main control unit 120 includes an A/D converter 121, a computing unit 122 and a communication unit 123.

When the power output from the power supply units 103 and 104 are received, the power integration unit 105 accumulates the power in the capacitors C11 and C21 once and output the power through the resistors R11 and R12 and the diodes D11 and D21, thereby integrating the power output from the power supply units 103 and 104.

In the power output from the power supply units 103 and 104, voltages are measured in the capacitors C11 and C21. Information about the measured voltage is sent to the main control unit 120. In the power output from the power supply units 103 and 104, currents passing through the resistors R11 and R21 are measured. Information about the measured currents is sent to the main control unit 120.

The main control unit 120 computes and obtains the internal power of the power integration unit 105 by using the information about the voltage and current received from the power integration unit 105.

The A/D converter 121 converts the information about the voltage and current received from the power integration unit 105 from an analog value to a digital value. The information about the voltage and current received from the power integration unit 105, which is converted into the digital value, is sent to the computing unit 122.

The computing unit 122 computes the total power of the power integration unit 105 using the information about the voltage and current of the power flowing in the power integration unit 105, which is converted into the digital value by the A/D converter 121. The result of computing the total power of the power integration unit 105 by the computing unit 122 is sent to the communication unit 123 and is used in the instruction of the information about the power extracted from the power integration unit 105 for the battery packs 110a and 110b.

The communication unit 123 performs information communication with the battery packs 110a and 110b. In the battery server 100 according to the present embodiment, the communication unit 123 transmits information about the power extracted from the power integration unit 105 to the battery packs 110a and 110b. The battery packs 110a and 110b receive the information transmitted from the communication unit 123 to the control unit 113 and receive the power output from the power integration unit 105.

As described above, for example, as the result of monitoring the power input to the power integration unit 105, it can be seen from the computing result by the computing unit 122 that power of 300 W is obtained. In this case, the communication unit 123 determines that 200 W is supplied to the battery pack 110a and 95 W is supplied to the battery pack 110b and provides the instruction to the battery packs 110a and 110b through the information communication line 108. The battery packs 110a and 110b which receive the instruction transmitted from the communication unit 123 absorb power allocated thereto and charges the battery modules 112 included therein.

By configuring the power integration unit 105 and the main control unit 120 as described above, the power input to the power integration unit 105 may be monitored so as to determine the quantity of power supplied to the battery packs 110a and 110b. As a result, the battery server 100 according to the embodiment of the present disclosure may simultaneously charge the plurality of battery packs 110a and 110b.

Up to now, the configurations of the power integration unit 105 and the main control unit 120 included in the battery server 100 according to the embodiment of the present disclosure are described in detail using FIG. 2. Next, the operation of the battery server 100 according to the embodiment of the present disclosure will be described.

[2-2. Operation of Battery Server]

Figure 3:
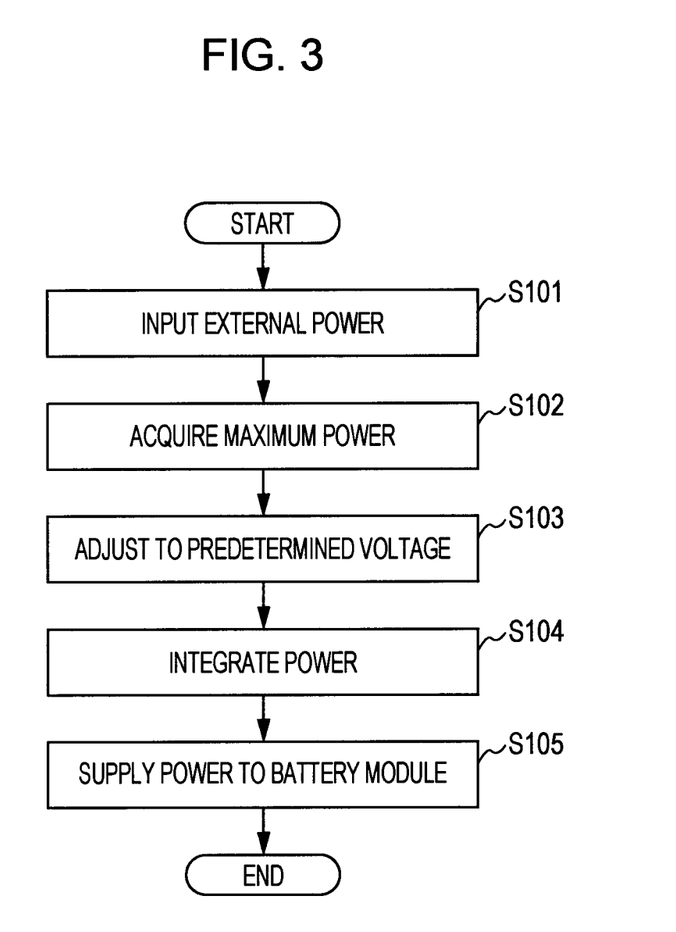
FIG. 3 is a flowchart illustrating the operation of the battery server according to an embodiment of the present disclosure.

FIG. 3 is a flowchart illustrating the operation of the battery server 100 according to an embodiment of the present disclosure. Hereinafter, the operation of the battery server 100 according to the embodiment of the present disclosure will be described using FIG. 3.

External power is input to the battery server 100 according to the embodiment of the present disclosure by the AC/DC input terminal 101 or the DC input terminal 102 (step S101).

If the external power is input to the battery server 100, the battery server 100 acquires maximum power through an MPPT or the like (step S102) and executes a process of adjusting the acquired maximum power to a predetermined voltage in the power supply units 103 and 104 (step S103).

When the voltage of the externally input power is adjusted to the predetermined voltage, the power supply units 103 and 104 output power, the voltages of which are adjusted, to the power integration unit 105. The power integration unit 105 integrates the power received from the power supply units 103 and 104 (step S104).

The main control unit 120 monitors the power transmitted from the power supply units 103 and 104 to the power integration unit 105 and measures the voltage and power. The main control unit 120 measures the total power of the power integration unit 105 and determines the power supplied to the battery packs 110a and 110b using information about the measured total power. The power integration unit 105 supplies power to the battery packs 110a and 110b (step S105) and the battery packs 110a and 110b receive the power from the power integration unit 105 based on the determined quantity of power and charge the battery modules 112.

By such an operation, the battery server 100 may simultaneously charge the battery packs 110a and 110b included therein. Accordingly, even when the externally input power of the battery server 100 exceeds the quantity of power charged in one battery pack, the exceeding power may be used to charge another battery pack and the power supplied to the battery server 100 may be efficiently used without waste.

Figure 4:
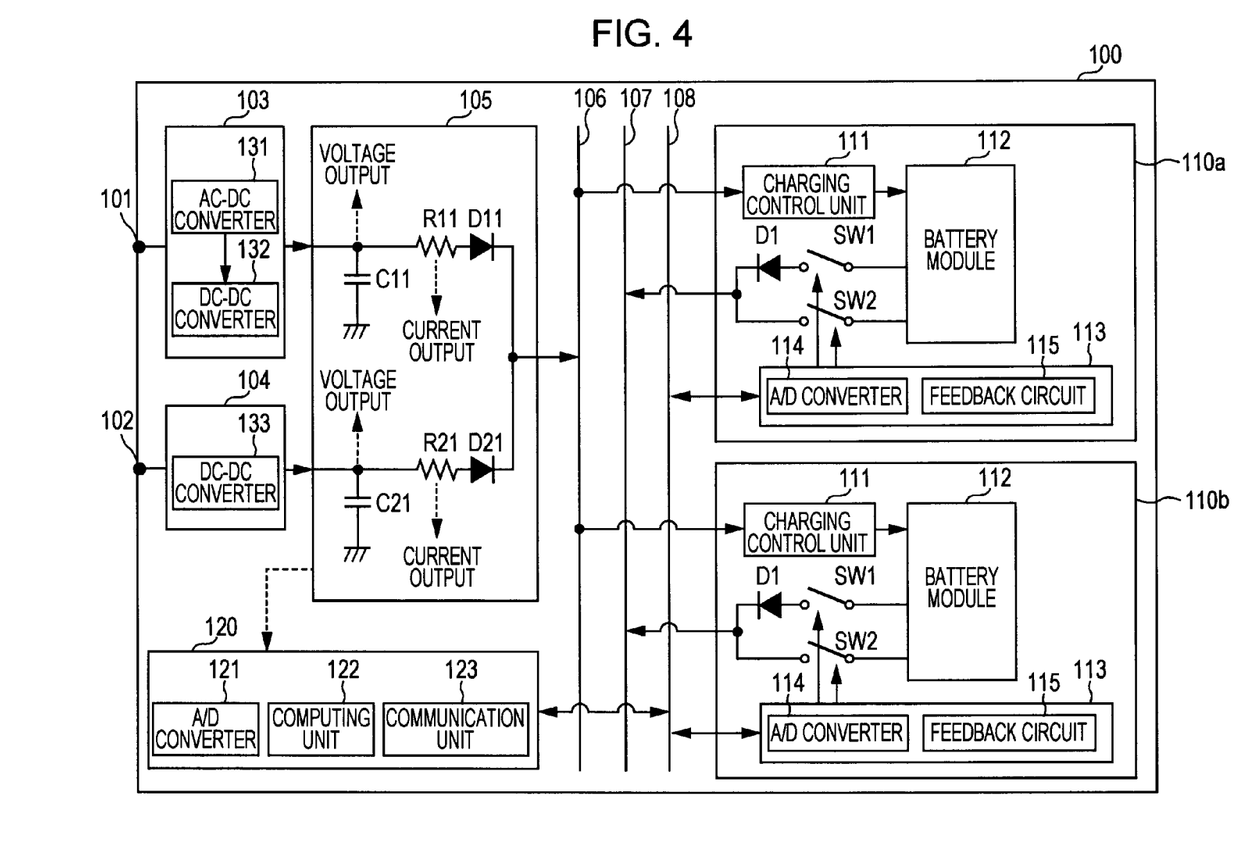
FIG. 4 is an explanatory diagram showing another configuration example of the battery server according to an embodiment of the present disclosure.

Next, another configuration example and operation example of the battery server 100 according to the embodiment of the present disclosure will be described. FIG. 4 is an explanatory diagram showing another configuration example of the battery server 100 according to an embodiment of the present disclosure. The battery server 100 shown FIG. 4 is different from the battery server 100 shown in FIG. 2 in that an A/D converter 114 for monitoring the quantity of voltage or the quantity of current flowing in the battery packs 110a and 110b and a feedback circuit 115 for feeding the quantity of power supplied to the battery packs 110a and 110b to the main control unit 120 back are provided in the control unit 113 of each of the battery packs 110a and 110b.

The battery server 100 shown in FIG. 4 specifies a charging ratio with respect to the battery packs 110a and 110b from the main control unit 120 when charging the battery packs 110a and 110b. As shown in FIG. 4, in a state in which the two battery packs 110a and 110b are connected to the battery server 100, power is generated outside the battery server 100 and power is supplied to the battery packs 110a and 110b. The battery packs 110a and 110b start charging according to the charging ratio specified from the main control unit 120. For example, the main control unit 120 specifies the charging ratio of the battery packs 110a and 110b to 2:1 and, when power of 300 W is generated and supplied to the battery server 100, the battery packs 110a and 110b extract power from the generated power little by little and start charging. The battery packs 110a and 110b perform synchronization and switch timing when power is extracted from the power integration unit 105.

The main control unit 120 specifies the increasing quantity of power at the time of charging with respect to the battery packs 110a and 110b. For example, the main control unit 120 may determine that power is increased by 20 W with respect to the battery pack 110a and is increased by 10 W with respect to the battery pack 110b.

In a state in which power of 300 W is generated, if the power of the battery pack 110a reaches 200 W and the power of the battery pack 110b reaches 100 W (this state is referred to as a "normal state"), the main control unit 120 switches the charging of the battery packs 110a and 110b to an autonomous adjustment mode. For example, if the battery packs 110a and 110b are charged to exceed the quantity of generated power, the voltage supplied from the power integration unit 105 is decreased. The decrease of the supplied voltage is detected by the A/D converter 114 of the control unit 113 and is fed back by the feedback circuit 115 so as to be adjusted.

That is, the quantity of power is increased from start-up to the normal state while performing synchronization and the battery packs 110a and 110b are autonomously operated when the quantity of power exceeds the assumed quantity of voltage supplied from the power integration unit 105. The assumed voltage of the power integration unit 105 is predetermined and the assumed voltage is output. If load greater than generated power is applied, since the output voltage of the power integration unit 105 is decreased, the control unit 113 detects the output voltage and each battery pack adjusts the quantity of current so as to suit the output voltage of the power integration unit 105.

Another example will be described. For example, in the case where the battery server 100 charges only the battery pack 110a, the battery pack 110b is added to the battery server 100 and the battery pack 110b is charged. The quantity of generated power is 300 W and the battery pack 110a already receives power of 200 W. Then, if the charging ratio of the battery packs 110a and 110b is 2:1, the main control unit 120 charges the battery pack 110b up to 100 W. For example, the main control unit 120 confirms or detects the power currently consumed in the battery pack 110a through communication or using a sensor and instructs an absorption power value of the battery pack 110b to the battery pack 110b according to the charging ratio.

If no problem occurs even when load is applied to the battery pack 110b up to 100 W, the main control unit 120 switches the battery packs 110a and 110b to the autonomous adjustment mode for autonomously adjusting power. Meanwhile, if the potential of the power integration unit 105 is decreased before load of 100 W is applied, the main control unit 120 decreases the load of the battery pack 110a. For example, if the potential of the power integration unit 105 is decreased when 90 W is applied to the battery pack 110b, the main control unit 120 changes the load of the battery pack 110a to 180 W. Thereafter, the battery packs 110a and 110b autonomously adjust power with the predetermined charging ratio.

The charging ratio of the battery packs may be changed after being determined once. For example, the charging ratio of the battery packs 110a and 110b is determined to 2:1 and, if the power of the battery packs 110a and 110b is in the normal state with that ratio, the charging ratio may be changed to 1:1. At this time, the absorption power of the battery pack with high power is adjusted to suit that of the battery pack with low power. That is, the absorption power of both battery packs are set to 100 W. Thereafter, the power of both battery packs may be increased by synchronization and supplied by 150 W.

Next, the case where the power supplied to the battery server 100 is changed is considered. For example, when power obtained by photovoltaic power generation is supplied, sunlight is changed. When more power may be generated due to fine weather, the absorption power of each battery pack is automatically increased. The output voltage of the power integration unit 105 is monitored by the control unit 113 of each battery pack so as to adjust power. Similarly, even when power generated by photovoltaic power generation is decreased due to cloudy weather, the output voltage of the power integration unit is monitored by the control unit 113 of each battery pack so as to adjust power.

The main control unit 120 may change to designation of the above-described charging ratio and determine the priority of the charged battery pack. For example, the main control unit 120 may determine priority such that the battery packs 110a and 110b are sequentially charged. In this case, if power is left even when the battery pack 110a having first priority is charged at a maximum speed, the main control unit 120 allows the power to be supplied to the battery pack 110b having next priority.

When the priority is determined such that the battery packs 110a and 110b are sequentially charged, the main control unit 120 communicates with the battery pack 110a having first priority and monitors whether or not charging is started at a maximum speed. When charging of the battery pack 110a is started at the maximum speed and power is left, the main control unit 120 allows the battery pack 110b having next priority to be charged. If the voltage begins to be decreased thereafter, the main control unit 120 decreases the absorption power of the battery pack 110b. If power is insufficient even in this case, the main control unit 120 decreases the absorption power of the battery pack 110a and the battery pack having high priority is first charged. Even when three or more battery packs are connected, similarly, the power of the battery packs may be sequentially set to 0 from a battery pack having low priority and a battery pack having high priority may be first charged.

Figure 5:
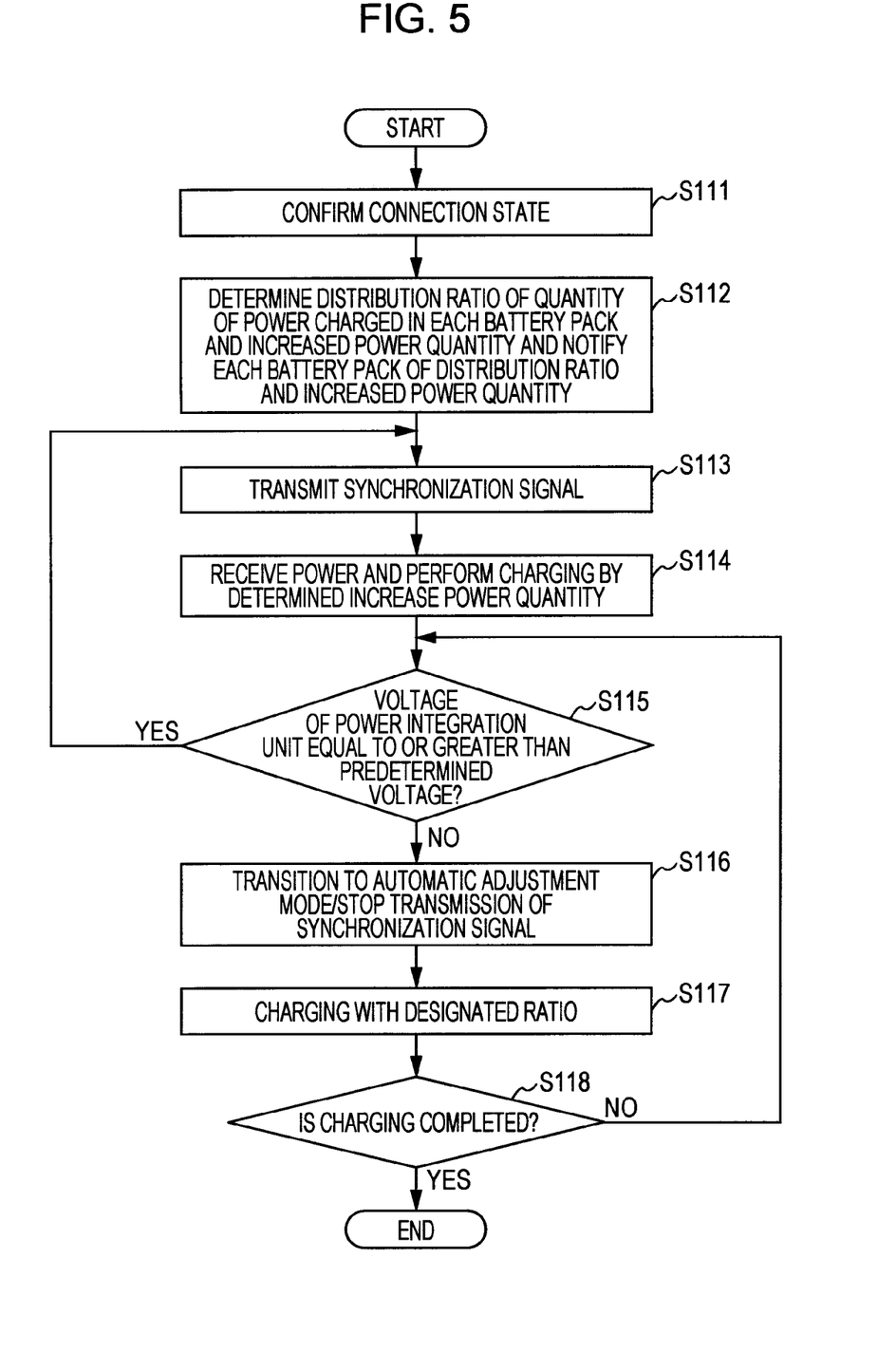
FIG. 5 is a flowchart illustrating another operation example of the battery server according to an embodiment of the present disclosure.

FIG. 5 is a flowchart illustrating another operation example of the battery server 100 according to an embodiment of the present disclosure.

When charging the battery packs, first, the main control unit 120 confirms the connection state of the battery packs (step S111). The main control unit 120 may use any communication protocol and packet in order to confirm the connection state of the battery packs. In the following description, it is assumed that the main control unit 120 conforms that two battery packs 110a and 110b are connected to the battery server 100.

If the main control unit 120 confirms the connection state of the battery packs, subsequently, the main control unit 120 determines a distribution ratio of the quantity of power charged in each battery pack and an increased power quantity and notifies each battery pack of the distribution ratio and the increased power quantity (step S112). At this time, the main control unit 120 may set only one battery pack to maximum power and set the quantity of power of the other battery pack to 0.

Subsequently, the main control unit 120 transmits a synchronization signal to the battery packs 110a and 110b (step S113). The battery packs 110a and 110b which receive the synchronization signal receive power by the increased power quantity determined in step S112 and performs charging (step S114).

Thereafter, the main control unit 120 detects the output voltage of the power integration unit 105 and determines whether the output voltage is equal to or greater than a predetermined voltage (step S115).

If the output voltage of the power integration unit 105 is equal to or greater than the predetermined voltage as the result of determination of step S115, the process returns to step S113 and the main control unit 120 continuously transmits the synchronization signal. If the output voltage of the power integration unit 105 is less than the predetermined voltage as the result of determination of step S115, the main control unit 120 switches the battery packs 110a and 110b to the automatic adjustment mode and stops the transmission of the synchronization signal (step S116).

Thereafter, the battery packs 110a and 110b adjusts the quantity of consumed current to the ratio determined in the step S112 (step S117). Thereafter, the battery packs 110a and 110b are continuously charged by continuously performing adjustment to the same ratio.

Thereafter, the battery packs 110a and 110b determine whether charging is completed (step S118) and the process returns to step S115 if charging is not completed and the determination as to whether or not the output voltage of the power integration unit 105 is equal to or greater than the predetermined voltage. In contrast, if the charging of the battery packs 110a and 110b is completed, the process is finished.

The main control unit 120 does not instruct the quantity of power charged in the battery packs 110a and 110b sequentially, but determines only information about the outline of charging, such as a charging ratio or an increased power quantity, and provides an instruction to the battery packs 110a and 110b. The detailed control is performed by each battery pack.

As described above, if a plurality of battery packs are simultaneously charged, generally, the charging of any one battery pack is first completed. In this case, with respect to the other battery packs (the charging of which is not completed), the above-described procedure is applied again so as to perform the process without problem.

3. Summary

As described above, according to the embodiment of the present disclosure, if external power is supplied to the battery server 100 including a plurality of battery packs 110*a* and 110*b*, it is possible to simultaneously charge the plurality of battery packs 110*a* and 110*b*. Even when the externally input power of the battery server 100 exceeds the quantity of power which may be charged in one battery pack, the exceeding power may be used to charge the other battery packs. Accordingly, it is possible to efficiently use the power supplied to the battery server 100 without waste.

When the plurality of battery packs 110*a* and 110*b* are simultaneously charged, the main control unit 120 monitors the power transmitted from the power supply units 103 and 104 to the power integration unit 105. The main control unit 120 determines the power supplied from the power integration unit 105 to the plurality of battery packs 110*a* and 110*b*. At this time, the quantity of power supplied to the battery packs 110*a* and 110*b* is determined such that power slightly less in quantity than the total quantity of power received by the power integration unit 105 from the power supply units 103 and 104 is supplied to the plurality of battery packs 110*a* and 110*b*. If the quantity of power is increased, load is increased and thus power shortage may occur. For example, even when the output voltage of the power supply unit 103 is slightly higher than the output voltage of the power supply unit 104, it is possible to equalize the outputs of both power supply units.

Although the exemplary embodiments of the present disclosure are described in detail with reference to the accompanying drawings, the present disclosure is not limited to the examples. It is apparent to those skilled in the art that various changes or modifications are made without departing from the scope of the claims and are included in the technical range of the present disclosure.

The present disclosure contains subject matter related to that disclosed in Japanese Priority Patent Application JP 2010-273637 filed in the Japan Patent Office on Dec. 8, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A charging control device comprising:
   a plurality of battery packs including a first battery pack including a first charging control unit configured based on battery characteristics of the first battery pack and a second battery pack including a second charging control unit configured based on battery characteristics of the second battery pack which is different than the battery characteristics of the first battery pack;
   a plurality of power input units each configured to input power;
   a power integration unit configured to integrate the plurality of power inputs by the plurality of power input units into an integrated power output; and
   a main control unit configured to measure power of each of the power inputs into the power integration unit and determine a power supply ratio allocating a relative percentage of the power supplied from the power integration unit to each of the plurality of battery packs based on the measured power to control simultaneous charging of the plurality of battery packs, wherein the first battery pack and the second battery receive different levels of power input according to the power supply ratio when being simultaneously charged from the integrated power output,
   wherein the first battery pack includes a first battery pack control unit configured to perform communication with the main control unit and the second battery pack includes a second battery pack control unit configured to perform communication with the main control unit, wherein the power supply ratio indicates a fraction of allocation of the supplied power,
   wherein the first charging control unit, the second charging control unit, the plurality of power input units, the power integration unit and the main control unit are each implemented via at least one processor, and
   wherein each of the plurality of battery packs is further configured to autonomously decrease the power supplied from the power integration unit to a respective one of the plurality of battery packs in accordance with the power supply ratio and the integrated power output.

2. The charging control device according to claim 1, wherein:
   the first charging control unit is further configured to control charging of the first battery pack based on information about the power supplied from the power integration unit; and
   the second charging control unit is further configured to control charging of the second battery pack based on information about the power supplied from the power integration unit.

3. The charging control device according to claim 1, wherein the main control unit determines that power less than the total power input to the power integration unit is supplied to the first battery pack and the second battery pack, when the first battery pack and the second battery pack is determined to receive the integrated power.

4. The charging control device according to claim 1, wherein the main control unit includes:
   a computing unit configured to compute the power input to the power integration unit, and
   a communication unit configured to determine the power supplied to the first battery pack and the second battery pack from the power input to the power integration unit and communicate with the first battery pack and the second battery pack.

5. The charging control device according to claim 1, wherein at least one of the first battery pack and the second battery pack are attachable and detachable.

6. The charging control device according to claim 1, wherein when the power supplied from the power integration unit to the plurality of battery packs is increased or decreased, each of the plurality of the battery packs automatically adjusts the power supplied from the power integration unit based on change of charged power of each of the battery packs.

7. The charging control device according to claim 1, wherein the power supply ratio indicates a relative distribution amount of total supplied power.

8. The charging control device according to claim 1, wherein each of the plurality of the battery packs includes a plurality of switches to discharge accumulated power.

9. The charging control device according to claim 1, wherein the second battery pack is different than the first battery pack.

10. A charging control method comprising:
inputting a plurality of power sources;
integrating the plurality of power sources to output an integrated power output;
measuring power of the plurality of power sources before integrating the plurality of power sources;
determining a power supply ratio allocating a relative percentage of the power supplied to respectively each of a first battery pack and a second battery pack based on the measured power; and
controlling simultaneous charging of the first battery pack and the second battery pack, wherein the first battery pack and the second battery receive different levels of power input according to the power supply ratio when being simultaneously charged from the integrated power output,
wherein the first battery pack includes a first battery pack control unit configured to perform communication with a main control unit and the second battery pack includes a second battery pack control unit configured to perform communication with the main control unit,
wherein the first battery pack control unit includes a first charging control unit configured based on battery characteristics of the first battery pack,
wherein the second battery pack control unit includes a second charging control unit configured based on battery characteristics of the second battery pack which is different than the battery characteristics of the first battery pack,
wherein the power supply ratio indicates a fraction of allocation of the supplied power, and
wherein each of the plurality of battery packs is further configured to autonomously decrease the power supplied from the power integration unit to a respective one of the plurality of battery packs in accordance with the power supply ratio and the integrated power output.

11. A charging control device comprising:
a plurality of battery packs including a first battery pack including a first charging control unit configured based on battery characteristics of the first battery pack and a second battery pack including a second charging control unit configured based on battery characteristics of the second battery pack which is different than the battery characteristics of the first battery pack;
a plurality of power input units configured to input power;
a power integration unit configured to integrate the plurality of power inputs by the plurality of power input units into an integrated power output; and
a main control unit configured to instruct a power supply ratio allocating a relative percentage of the power supplied from the power integration unit to each of the plurality of battery packs and a power increase or decrease quantity of the first battery pack and the second battery pack and control simultaneous charging of the plurality of battery packs, wherein the first battery pack and the second battery receive different levels of power input according to the power supply ratio when being simultaneously charged from the integrated power output,
wherein the first battery pack includes a first battery pack control unit configured to perform communication with the main control unit and the second battery pack includes a second battery pack control unit configured to perform communication with the main control unit,
wherein the power supply ratio indicates a fraction of allocation of the supplied power,
wherein the first charging control unit, the second charging control unit, the plurality of power input units, the power integration unit and the main control unit are each implemented via at least one processor, and
wherein each of the plurality of battery packs is further configured to autonomously decrease the power supplied from the power integration unit to a respective one of the plurality of battery packs in accordance with the power supply ratio and the integrated power output.

12. The charging control device according to claim 11, wherein the first battery pack control unit and the second battery pack control unit adjusts the quantity of power supplied from the power integration unit to become the ratio received from the main control unit.

13. The charging control device according to claim 11, wherein the first battery pack includes a first detection unit and the second battery pack includes a second detection unit both configured to detect the output voltage of the power integration unit, and the main control unit adjusts the output voltage of the power integration unit.

14. A charging control device comprising:
a plurality of battery packs including a first battery pack including a first charging control unit configured based on battery characteristics of the first battery pack and a second battery pack including a second charging control unit configured based on battery characteristics of the second battery pack which is different than the battery characteristics of the first battery pack;
a plurality of power input units configured to input power;
a power integration unit configured to integrate the plurality of power inputs by the plurality of power input units into an integrated power output; and
a main control unit configured to instruct power supply priority of the first battery pack and the second battery pack and control simultaneous charging of the plurality of battery packs, wherein the first battery pack and the second battery receive different levels of power input when being simultaneously charged from the integrated power output,
wherein the first battery pack includes a first battery pack control unit configured to perform communication with the main control unit and the second battery pack includes a second battery pack control unit configured to perform communication with the main control unit,
wherein the power supply ratio indicates a fraction of allocation of the supplied power,
wherein the main control unit further configured to determine a power supply ratio allocating a relative percentage of the power supplied from the power integration unit to each of the plurality of battery packs based on the integrated power output to control simultaneous charging of the plurality of battery packs, wherein the first battery pack and the second battery pack receive different levels of power input according to the power supply ratio when being simultaneously charged from the integrated power output,
wherein the first charging control unit, the second charging control unit, the plurality of power input units, the power integration unit and the main control unit are each implemented via at least one processor, and
wherein each of the plurality of battery packs is further configured to autonomously decrease the power supplied from the power integration unit to a respective one of the plurality of battery packs in accordance with the power supply ratio and the integrated power output.

15. The charging control device according to claim 14, wherein the first battery pack control unit and the second battery pack control unit adjusts a level of power supplied from the power integration unit according to the priority received from the main control unit.

16. The charging control device according to claim 14, wherein the first battery pack includes a first detection unit and the second battery pack includes a second detection unit, wherein the first detection unit and the second detection unit are configured to detect an output voltage of the power integration unit, and     wherein the main control unit adjusts the output voltage of the power integration unit based on the output voltage detected by the first detection unit and the second detection unit.

\* \* \* \* \*